(12) United States Patent  
Blatchley et al.

(10) Patent No.: US 8,031,272 B2
(45) Date of Patent: Oct. 4, 2011

(54) SYSTEM AND METHOD OF ADJUSTING VIEWING ANGLE FOR DISPLAY

(75) Inventors: Robert D. Blatchley, Longmont, CO (US); Jurij M. Deputat, Longmont, CO (US); Donald P. Taylor, III, Longmont, CO (US); Stephen E. Zimmermann, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1110 days.

(21) Appl. No.: 11/780,409

(22) Filed: Jul. 19, 2007

(65) Prior Publication Data

US 2009/0025022 A1 Jan. 22, 2009

(51) Int. Cl.
*H04N 5/64* (2006.01)
*G06K 9/00* (2006.01)
*H04H 60/56* (2008.01)

(52) U.S. Cl. ............... 348/836; 382/103; 725/12
(58) Field of Classification Search .......... 348/836; 345/158; 382/103
See application file for complete search history.

(56) References Cited

U.S. PATENT DOCUMENTS

| 5,418,595 | A | | 5/1995 | Iwasaki et al. |
| 5,805,201 | A | | 9/1998 | Fujiwara |
| 6,131,874 | A | * | 10/2000 | Vance et al. ............ 248/550 |
| 6,191,773 | B1 | | 2/2001 | Maruno et al. |
| 6,348,928 | B1 | * | 2/2002 | Jeong ............ 345/649 |
| 6,501,515 | B1 | | 12/2002 | Iwamura |
| 6,633,286 | B1 | | 10/2003 | Do et al. |
| 6,633,346 | B1 | | 10/2003 | Yamamoto |
| 6,931,596 | B2 | * | 8/2005 | Gutta et al. ............ 715/728 |
| 7,023,499 | B2 | | 4/2006 | Williams et al. |
| 7,024,683 | B1 | * | 4/2006 | Gee, Jr. ............ 725/132 |
| 7,151,967 | B2 | * | 12/2006 | Chen et al. ............ 700/56 |
| 2002/0053635 | A1 | | 5/2002 | Schroter et al. |
| 2005/0253538 | A1 | | 11/2005 | Shah et al. |
| 2005/0273291 | A1 | * | 12/2005 | Zukowski et al. ............ 702/127 |
| 2006/0006999 | A1 | * | 1/2006 | Walczyk et al. ......... 340/539.27 |
| 2006/0071135 | A1 | * | 4/2006 | Trovato ............ 248/289.11 |
| 2007/0012869 | A1 | | 1/2007 | Mullin et al. |
| 2007/0180129 | A1 | * | 8/2007 | Tolmie et al. ............ 709/230 |
| 2007/0247717 | A1 | | 10/2007 | Konno et al. |
| 2009/0174658 | A1 | | 7/2009 | Blatchley et al. |

OTHER PUBLICATIONS

Non-final office action dated Nov. 22, 2010 for U.S. Appl. No. 11/969,444.

* cited by examiner

*Primary Examiner* — Bipin Shalwala
*Assistant Examiner* — Jonathan R King
(74) *Attorney, Agent, or Firm* — Arthur J. Samodovitz

(57) ABSTRACT

A system and method of adjusting a display and, more particularly, to a system and method of automatically adjusting a viewing angle of a display is provided. The method includes determining a location of one or more viewers and adjusting the display based on an average viewing location of the one or more viewers. The system includes a computer infrastructure. The computer infrastructure is operable to receive a detection signal indicative of a location of one or more viewers, and adjust the display based on an average viewing location of the one or more viewers.

15 Claims, 11 Drawing Sheets

SYSTEM AND METHOD OF ADJUSTING VIEWING ANGLE FOR DISPLAY

FIELD OF THE INVENTION

The invention generally relates to a system and method of adjusting a display and, more particularly, to a system and method of automatically adjusting a viewing angle of a display.

BACKGROUND OF THE INVENTION

Televisions and other displays and monitors are either wall mounted or placed on a support of some type. The televisions and other displays and monitors are stationary and located in a central location in an attempt to provide viewers with an optimal view of the picture. However, with the advent of flat screen televisions, LCD technology, plasma technology, etc. it is not always possible for all viewers to view the screen. For example, it is know that viewers at the side of the screen are unable to properly view the screen.

It is also known that advertisements are not always effectively positioned to ensure that a maximum viewing time is provided to the consuming public. Again, this is due to the fact that the advertisements are static and located in a stationary position. This can effectively decrease the effectiveness of the advertisement, as viewers may not have a proper viewing angle to read the advertisement or appreciate the subtleties of the advertisements.

Accordingly, there exists a need in the art to overcome the deficiencies and limitations described hereinabove.

SUMMARY OF THE INVENTION

In a first aspect of the invention, a method is provided for adjusting a viewing angle of a display. The method comprises determining a location of one or more viewers and adjusting the display based on an average viewing location of the one or more viewers.

In another aspect of the invention, a system for deploying an application for adjusting a viewing angle of a display is provided. The system comprises providing a computer infrastructure. The computer infrastructure is operable to receive a detection signal indicative of a location of one or more viewers, and adjust the display based on an average viewing location of the one or more viewers.

In still another aspect of the invention, a computer program product comprises a computer usable medium having readable program code embodied in the medium. The computer program product includes at least one component to provide the processes of the invention.

DETAILED DESCRIPTION OF EMBODIMENTS OF THE INVENTION

The invention generally relates to a system and method of adjusting a display and, more particularly, to a system and method of automatically adjusting a viewing angle of a display. By implementing the system and method of the invention, it is now possible to ensure that a viewer or a plurality of viewers has an optimal view of the display, regardless of their viewing location with respect to the display.

In embodiments, different technologies such as, for example, facial recognition technology, facial detection technology, RFID (Radio Frequency Identification) technology, pressure sensors, heat sensors, motion detectors, distance detectors or manual selection via use of switches or buttons can be implemented to determine the position of viewers within a viewing distance. In accordance herewith, the viewing angle of a display for a single user or a plurality of users can be adjusted based on the detection of the viewer or plurality of viewers. Also, as discussed herein, the system and method of the invention is fully configurable. In implementation, the display may be a television monitor, computer monitor, static images such as advertisements, digital picture frames, cash register displays, etc.

The method and system of the invention can preferably be implemented to maximize or increase viewing time of advertisements by the consuming public, e.g., that the advertisement is optimally seen for the longest possible time by a consumer. As such, in one implementation, the display is an advertisement in a retailing environment, which can be in the form of a monitor, e.g., television or computer, or a static image, amongst other types of displays. The advertisement may be implemented in any retail environment such as a window display, a shopping mall, a standalone display within the store to advertise certain merchandise within the locality of the display, amongst other locations. Of course, it should be appreciated by those of skill in the art that the above environments are provided herein as illustrative examples and should not be considered a limiting feature of the invention.

Figure 1:
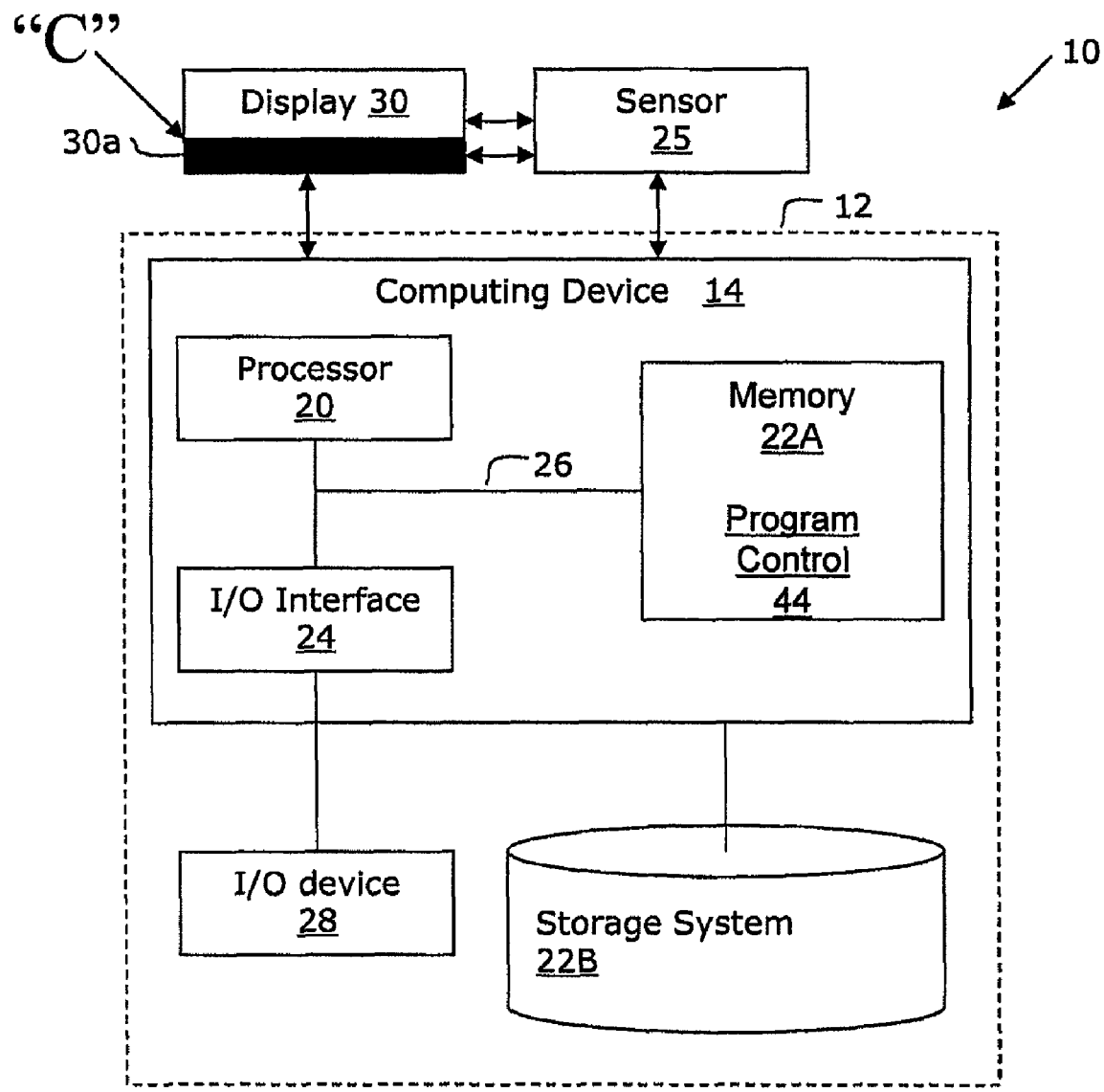
FIG. 1 shows an illustrative environment for implementing the processes in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that is operable to adjust the viewing angle of a display based on the location of the viewers. (Hereinafter the term "display" will be used generically to include any type of display, monitor, screen, image, advertisement, picture, etc.)

More specifically, the computing device 14 is operable to receive a signal from a sensor 25 which is configured to sense the location of one or more viewers within the viewing range of a display 30. The sensor 25 may be, for example, a facial recognition sensor, facial detection sensor, an RFID receiver used in conjunction with an RFID worn by a user, a motion detector, a distance measuring device (e.g., photodiode sensor), heat sensor and/or pressure sensor, all of which are known to those of skill in the art. The sensor 25 may be connected to the computing device 14, display 30 and/or mount or stand 30a, via a wire or wireless connection, as discussed in detail below.

In embodiments, the facial detection or facial recognition may sense a position of a viewer's face; whereas, a pressure sensor may sense that a viewer is located at or near the placement of the sensor (e.g., the viewer is sitting on a chair with a pressure sensor embedded therein or standing on a floor with a pressure sensor embedded therein). The motion detector can detect the presence and motion of a viewer within a certain distance of the detector. In embodiments it is also theoretically possible to configure the motion detector such that it detects a height of the viewer. In such an embodiment, the motion detector can be adjusted such that infants, pets, etc. will not affect the positioning of the display. The heat sensor can detect the position of the viewer and theoretically their relative size to other viewers.

The computing device 14 is also operable to receive a signal from a manual selection of switches or buttons, placed near the viewer. In this latter embodiment, the system will recognize the location of the switch or button, which has been depressed or activated by the user. In embodiments, the viewer can override the automatic adjustment or manually adjust the display via a control "C".

Although the viewing angle may be a default-viewing angle, depending on any of the below variables, in preferred embodiments, the computing device 14 will use the received signals to determine an optimal viewing angle of the display 30, based on, amongst other variables as discussed herein:
 (i) the location of the viewer(s);
 (ii) the height of the viewer(s);
 (iii) the number of viewers within viewing distance of the display;
 (iv) whether the viewer(s) is moving or substantially stationary;
 (v) the distance of any viewer movement;
 (vi) whether the viewer(s) has left the viewing area; and/or
 (vii) a predetermined time period.

The computing device 14, once it has determined the optimal viewing angle, will provide a signal to the stand or mount 30a, which supports and/or houses the display 30. In response to the signal, the stand or mount 30a will automatically adjust in order to move the display to the optimal viewing angle. The stand or mount 30a may be, for example, a cantilever arm structured and configured to move in three-dimensional space. For example, using servo-motors, gear systems, etc., all known in the art and as such needs no further explanation herein, the cantilever arm can rotate, tilt and move horizontally (telescoping feature), as well as be mounted on a rail to move vertically (or horizontally) with respect to the viewer(s).

In further implementations, the computing device 14 may be activated upon the motion of a viewer within a viewing distance of the display. Alternatively, a viewer may activate the computing device 14 upon manual selection. In still further alternative embodiments, the computing device 14 may be activated automatically when the display is turned on. The power for the mount or stand 30a may be provided by an on/off switch on the mount or stand 30a, as well as by a remote control. In embodiments, the remote control can learns the display's on/off signal so that when the display is turned on, the mount or stand is also activated.

Moreover, the power input from the display 30 can be provided to the mount or stand 30a such that the mount or stand 30a knows when the display is turned on. It is also contemplated that the computing device 14 may be activated and deactivated by, for example, a timer (e.g., turn on at 8:00 AM and shut down at 5:00 PM) or remain activated indefinitely (e.g., 24 hours a day) with or without a sleep mode. A motion activated or light activated sensor can also be used to activate the mount or stand 30a. In any event, the system and method of the invention is configurable based on any combination of the variables described herein.

In further embodiments, the mount or stand 30a is fully configurable; that is, the user can set when and how the mount moves. The configuration can be set and/or viewed via:
 (i) Onscreen inputs (e.g., the mount or stand 30a has input to the TV);
 (ii) An integrated display on the mount or stand 30a;
 (iii) Buttons/switch controls on the mount or stand 30a; and
 (iv) Remote input devices including, amongst others, remote control (infrared (ir) or radio frequency (rf)); wireless keyboard/mouse (ir or rf) that is accepted by a sensor on the mount or stand 30a; voice activated; button/switch controls on the mount or stand 30a; and/or button/switch controls at seating or viewing locations.

In embodiments, the mount or stand 30a can be configured one of many different default settings. For example, the default settings may include the following default positions pre-configured or set by the user, amongst others:
 (i) Default position when there are no viewers within a viewing distance of the display;
 (ii) Default position when more than a specified number of people are in viewable range;
 (iii) Default position when in "off" status; and
 (iv) Default position for a specific viewer (as detected by an input such as by the facial recognition system.

In additional embodiments, the mount or stand 30a can have specific user settings, any of which is configurable via software controls and executable by executable program code, as discussed herein. Thus, as the viewer is detected, e.g., via the facial recognition or RFID usage, the computing device 14 can adjust the mount or stand 30a automatically for that viewer. The specific user settings described below may be implemented with at least one of the sensors 25 (to detect the required information, e.g., a motion detector to detect movement of a viewer, etc.), as should be recognized by those of skill in the art. For example, the specific user settings may include, amongst others:
 (i) An amount (distance) needed to change viewing angle for the particular detected viewer;
 (ii) How long after movement the angle should change, e.g., one minute;
 (iii) A defined viewable range and angle, e.g., in a large room, 25 feet away may be considered in the viewable range;
 (iv) Maximum number of people to be considered for angle adjustment, e.g., five viewers maximum;
 (v) Search for static viewers only;
 (vi) Adjust for everyone walking by in viewable range up to a predetermined amount of potential viewers, e.g., 10 viewers;
 (vii) The largest group of static viewers or angle between any number of groups of static viewers;
 (viii) The amount of movement allowed to be considered a static viewer;
 (ix) The position of the static person(s), e.g., the static person(s) needs to be facing in the general direction of the display (using facial detection to actually see faces as opposed to bodies);
 (x) How fast should the angle of the display change (actual speed of the motor used on the mount or stand 30a);
 (xi) How the mount or stand 30a should turn on/off (e.g., motion, light, remote, switch, any combination thereof, etc.);
 (xii) Different default settings that are automatically configured from the factory for (home use, store use, type of advertisements (monitor, banner, etc.);
 (xiii) How often to detect viewers (constant, every 10 seconds, every minute, only if someone leaves the room, a predetermined amount of motion); and
 (xiv) The ability to exclude certain people (for instance infants/toddlers, pets, etc. by adjusting the sensors above a certain height. For example, the heat sensors can detect the size or shape of the individual heat signature; whereas, the facial detection can detect facial characteristics to determine approximate age. Also, the facial recognition can be used to determine the identity of the viewer.

The computing device 14 includes a processor 20, a memory 22A, an input/output (I/O) interface 24, and a bus 26. Further, the computing device 14 is in communication with an external I/O device/resource 28 and a storage system 22B. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The processor 20 executes computer program code (program control 44), which is stored in memory 22A and/or storage system 22B. While executing computer program code, the processor 20 can read and/or write data to/from memory 22A, storage system 22B, and/or I/O interface 24. The computer program code includes the processes of the invention as discussed herein.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a Client/Server) that communicate over any type of communications link, such as a network, a shared memory, or the like, to perform the process described herein. Further, while performing the processes described herein, one or more computing devices in the computer infrastructure 12 can communicate with the display 30, mount 30a, sensor 25 and/or one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

A service provider can create, maintain, deploy and support the infrastructure such as that described in FIG. 1. The service provider, such as a Solution Integrator, advertiser, etc., could offer to perform the processes described herein for payment from the customer(s) under a subscription and/or fee agreement and/or the service provider can receive payment from the sale of advertising content to one or more third parties.

Figure 2:
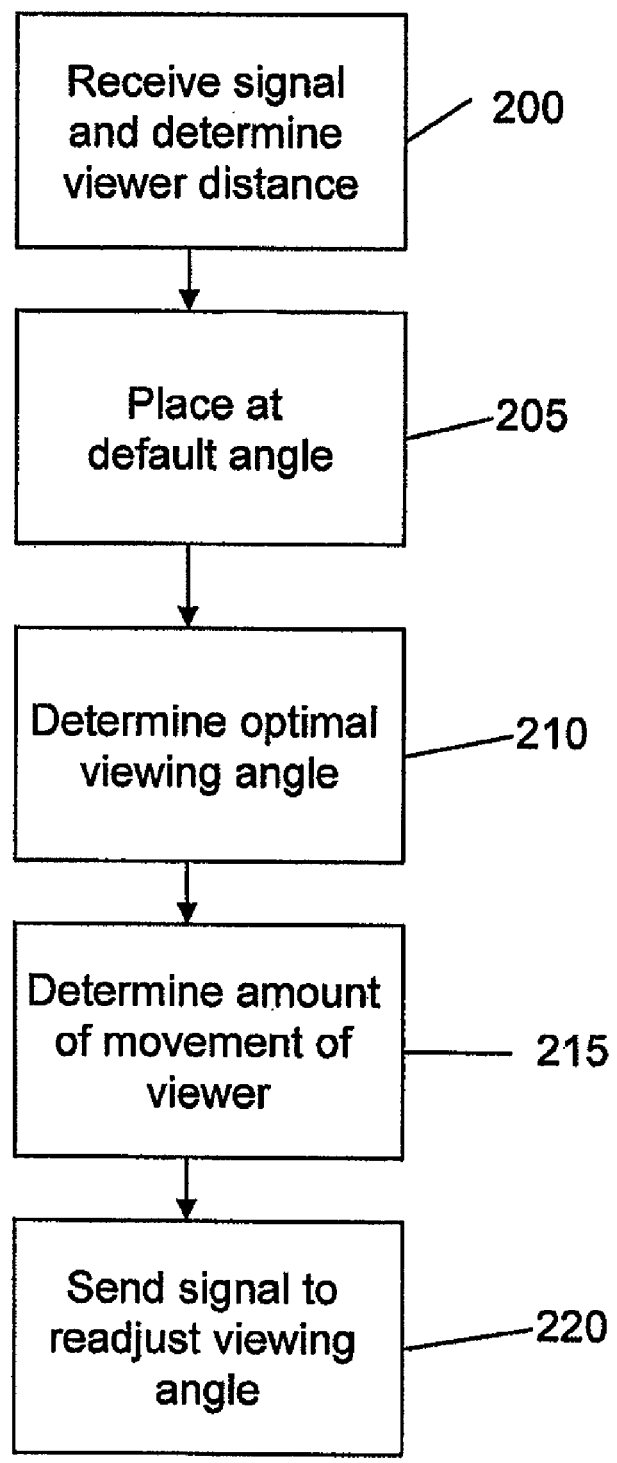
FIGS. 2-4 show flow diagrams implementing processes in accordance with aspects of the invention.
Figure 3:
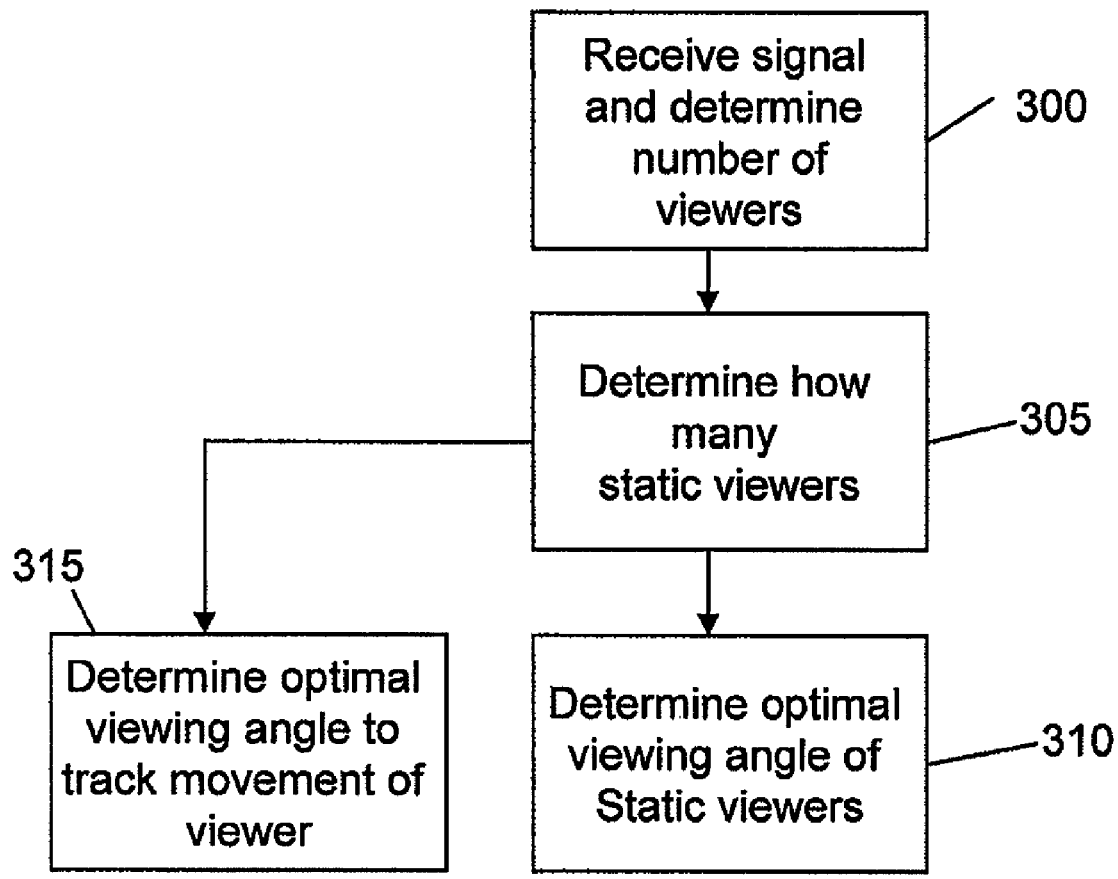
Figure 4:
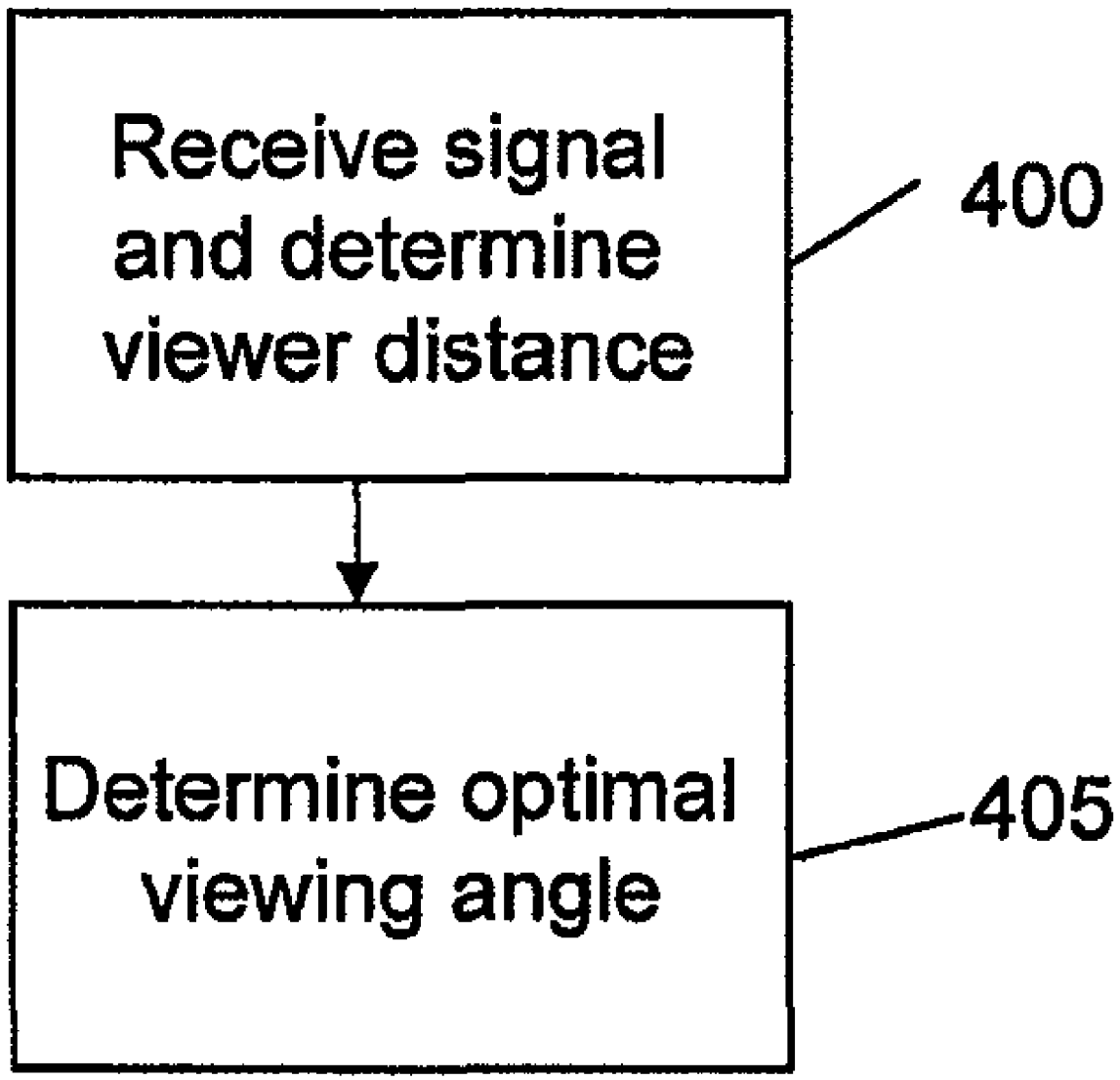

FIGS. 2-4 are flow diagrams implementing processes of the invention which may be implemented in the environment of FIG. 1. FIGS. 2-4 equally represent a high-level block diagram of the invention. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and optical disk. Current examples of optical disks include compact disk-read only memory (CD-ROM), compact disk-read/write (CD-R/W) and DVD.

Referring to FIG. 2, at step 200, a program control 44 receives a signal from a sensor(s) and determines whether one or more viewers are within a viewing distance of the display. If there are not any viewers located within a viewing distance, at step 205, the program control will send a default signal to the mount or stand which, in turn, will default to a predetermined viewing angle. The viewing angle may also return to a default position when the display is no longer in use.

If one or more viewers are in viewing distance of the display, at step 210, the program control will determine an optimal viewing angle of the display based on, for example, the location of the one or more viewers, the height of the one or more viewers, and/or the movement of the one or more viewers, etc. The optimal viewing angle can be based on an averaging of the angle of each viewer with respect to the display. For example, and as discussed in more detail below, the display can be adjusted to an angle of 90° when a first viewer is at 71° angle and a second viewer is at 109° angle from a default position of the display.

At step 215, if a viewer has moved, the program control will make a determination as to the distance of such movement. If the distance is within a certain predefined limit, e.g., five inches, the program control will remain idle (e.g., not send a signal to move the display). However, at step 220, if the distance is outside the predefined limit and, in embodiments, outside a predetermined time period, e.g., one minute, the program control will send a signal to the mount or stand to readjust the viewing angle of the display based on the new location of the viewer(s).

Referring to FIG. 3, the program control may be used in a retail setting, for example, where a number of people may be passing the display while other people are congregating next to the display. Of course, it should be understood that the embodiment of FIG. 3 may be implemented in other settings, which may have viewers moving past the display such as a restaurant or bar.

In this implementation, at step 300, the program control will make a determination as to how many viewers are within a viewing distance of the display. At step 305, the program control will make a determination as to how many viewers are substantially stationary (e.g., congregating near the display) and how many viewers are moving towards and away from the display.

At step 310, if there are a number of substantially stationary viewers above a threshold (e.g., three viewers), then the program control will send a signal to adjust the viewing angle of the display for the stationary viewers based on the flow of FIG. 2. At step 315, if there are a number of substantially stationary viewers below the threshold (e.g., three viewers), then the program control will send a signal to adjust the viewing angle to track the viewers moving away or toward the display based on their movements. At step 315, the program control, depending on the processing speed of the process, can be configured to stream signals in such a manner that the display will actually track the movement of the viewers, taking into consideration such variables as the speed of the viewers, the number of viewers, the direction of movement of the viewers, etc. In embodiments, depending on the variables, the program control may simply send a signal to maintain the mount at a default viewing angle, i.e., when there are many people, e.g., 10 potential viewers, moving in many different directions.

FIG. 4 shows a process to determine an optimal viewing angle. At step 400, the program control receives a signal from sensor(s) and determines whether one or more viewers are within a viewing distance of the display. If one or more viewers are in viewing distance of the display, at step 410, the program control will determine an optimal viewing angle of the display based on an average angle for each viewer with respect to the display. For example, the display would be adjusted to an angle of 95° when a first viewer is at 71° angle, a second viewer is at 109° angle and a third viewer is at 105° angle with respect to a default angle of the display.

If there are more than two viewers, in embodiments, the program control can weight or bias the viewing angle towards a side with the most viewers. Alternatively, in embodiments, the viewing angle may be adjusted based on an average of the extreme end viewers, For example, the display would be adjusted to an angle of 90° when a first viewer is at 71° angle, a second viewer is at 109° angle and any other viewer is located between the first and second viewers. In still further embodiments, the program control can adjust the height or tilt angle of the display based on the height of the viewers, as discussed below. Alternatively, the program control can default to a predetermined viewing angle for the display.

Figure 5:
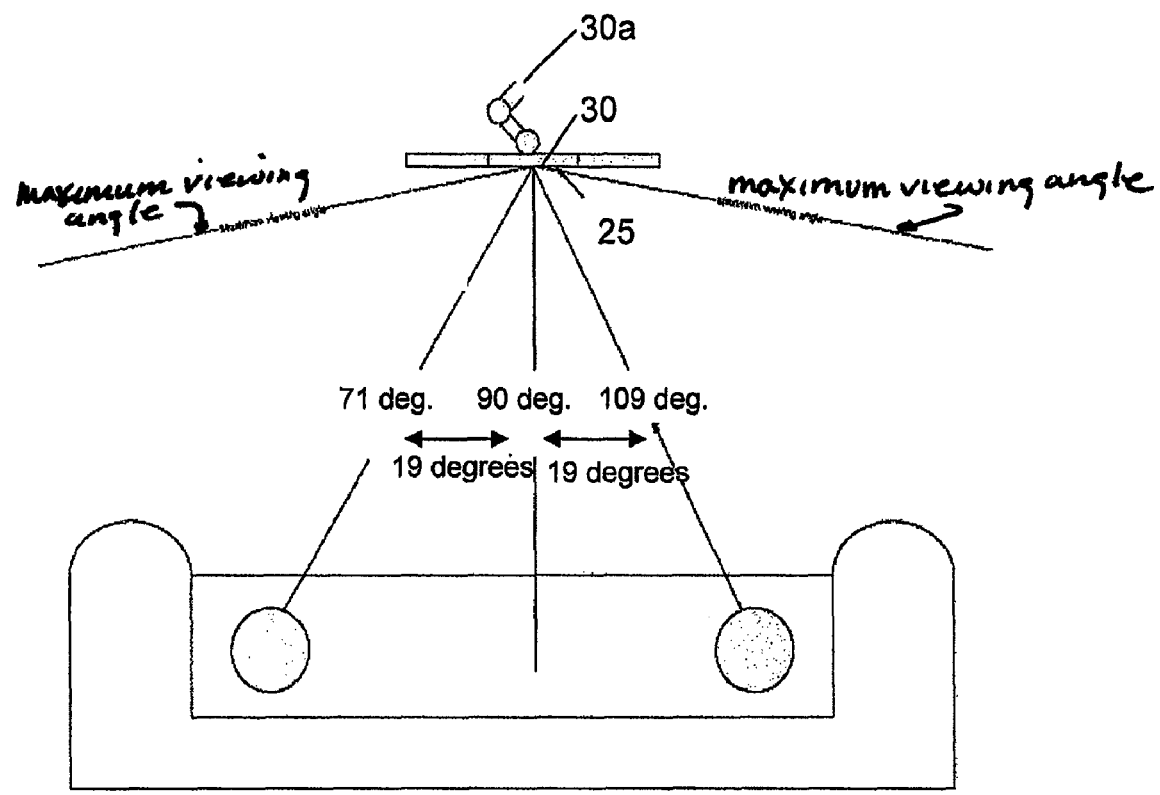
FIGS. 5-11 show various embodiments in accordance with aspects of the invention.
Figure 6:
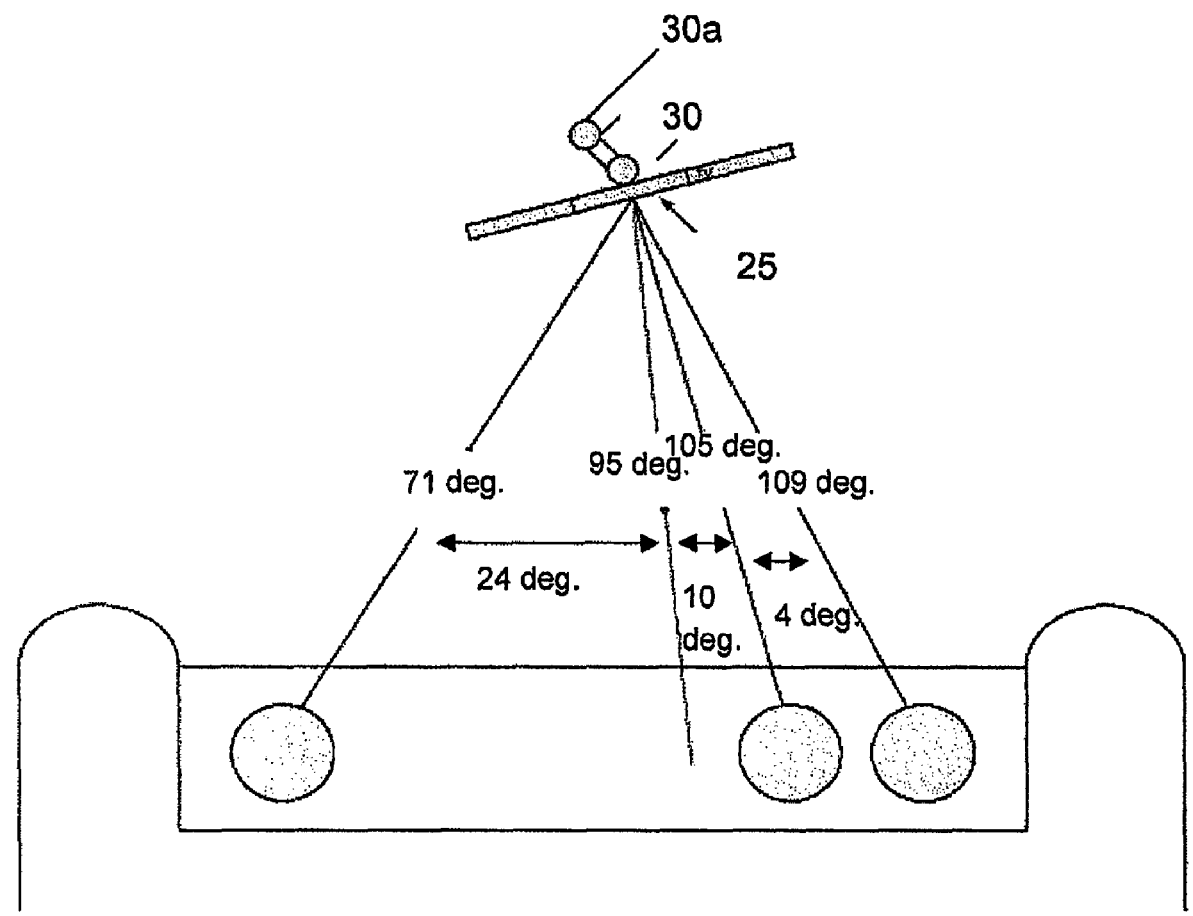
Figure 7:
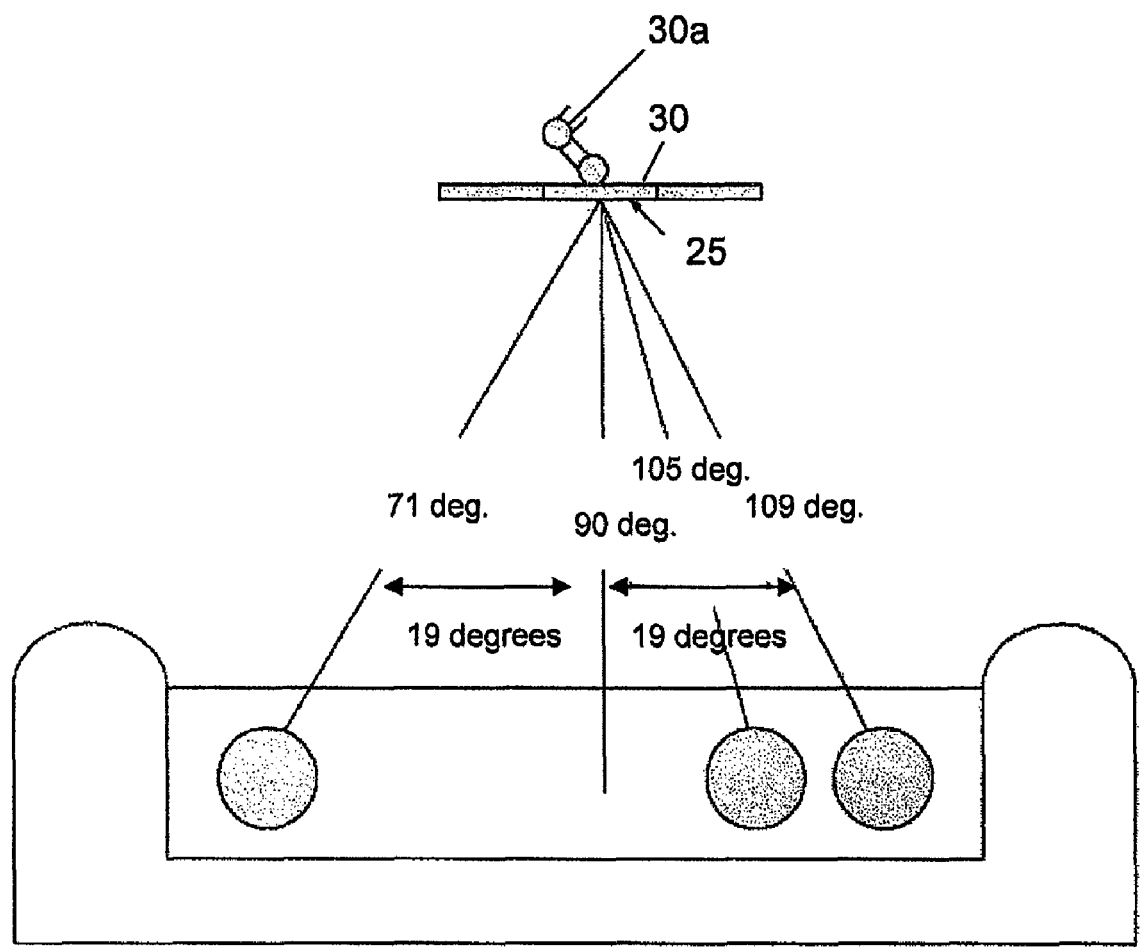

FIGS. 5-11 show various embodiments in accordance with aspects of the invention. In FIG. 5, two viewers are at an angle of 71° and 109°, respectively, from the display. In accordance with the invention, the display will be adjusted to 90° from the default angle using an average angle of the two viewers. In FIG. 6, three viewers are at an angle of 71°, 105° and 109°, respectively, from the display. In accordance with the invention, the display will be adjusted to 95° from the default angle using an average angle of the three viewers. This shows a bias or weighting towards the viewers on one side. In FIG. 7, three viewers are at an angle of 71°, 105°, and 109° respectively, from the display. In accordance with the invention, the display will be adjusted to 90° from the default angle using an average angle of the two end viewers only.

Figure 8:
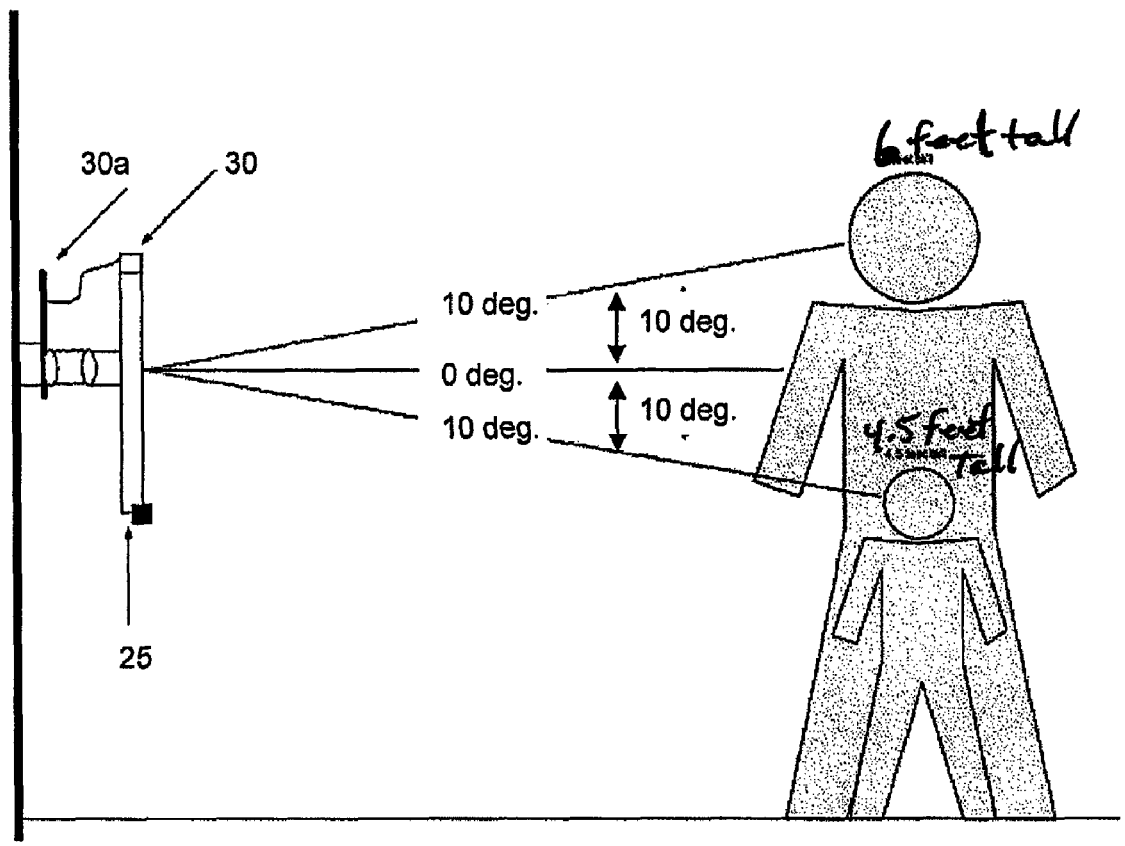
Figure 9:
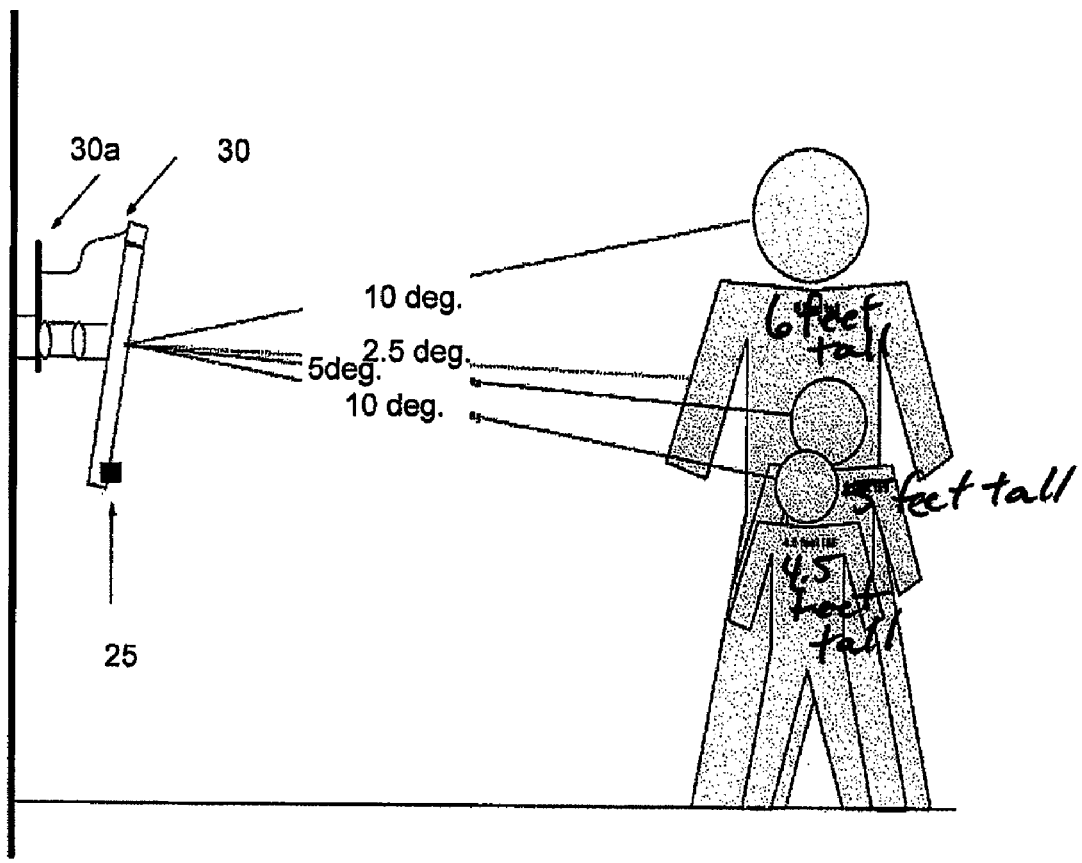
Figure 10:
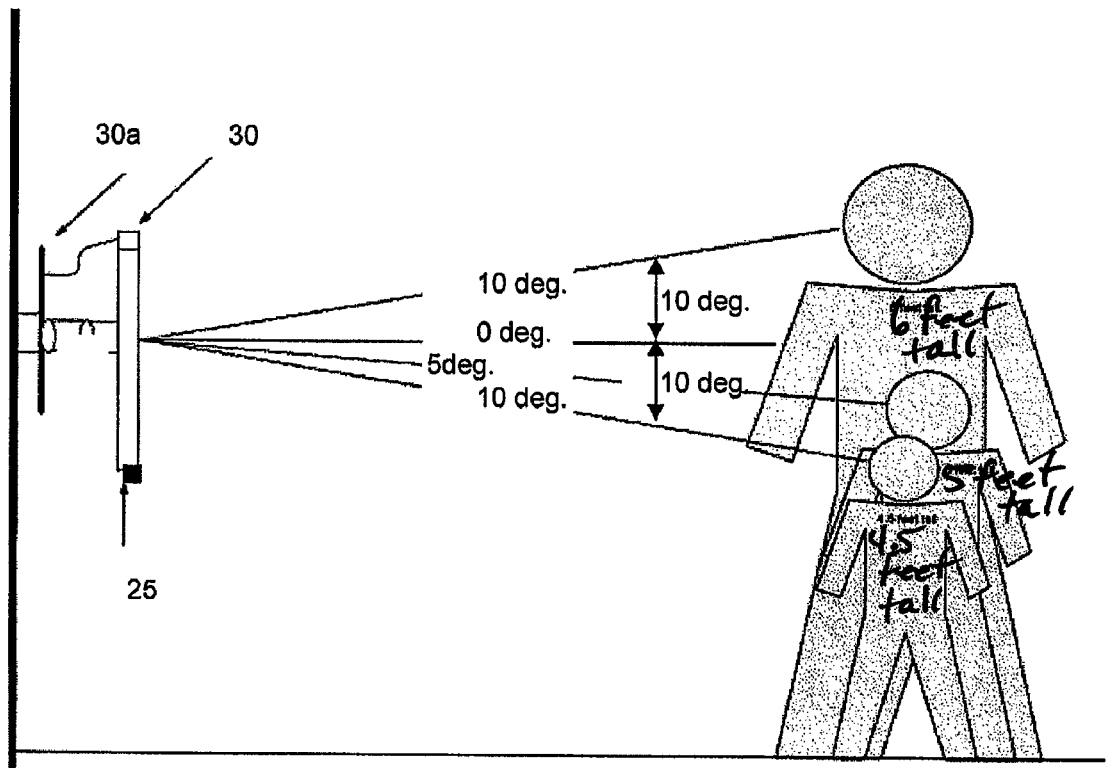

In FIG. 8, two viewers are at a different height, e.g., an angle of 10° and 10°, respectively, from the display. In accordance with the invention, the display will be adjusted to a tilt angle of 0° from the default angle using an average angle (height) of the two viewers. In FIG. 9, three viewers are at an angle of 10°, 5°, and 10°, respectively, from the display. In accordance with the invention, the display will be adjusted to a tilt angle of 2.5° from the default angle using an average angle (height) of the three viewers. This shows a bias or weighting based on the taller viewers. In FIG. 10, three viewers are at an angle of 10°, 5°, and 10°, respectively, from the display. In accordance with the invention, the display will be adjusted to a tilt angle 0° from the default angle using an average angle of the two extreme viewers (e.g., viewers of six feet and 4.5 feet).

Figure 11:
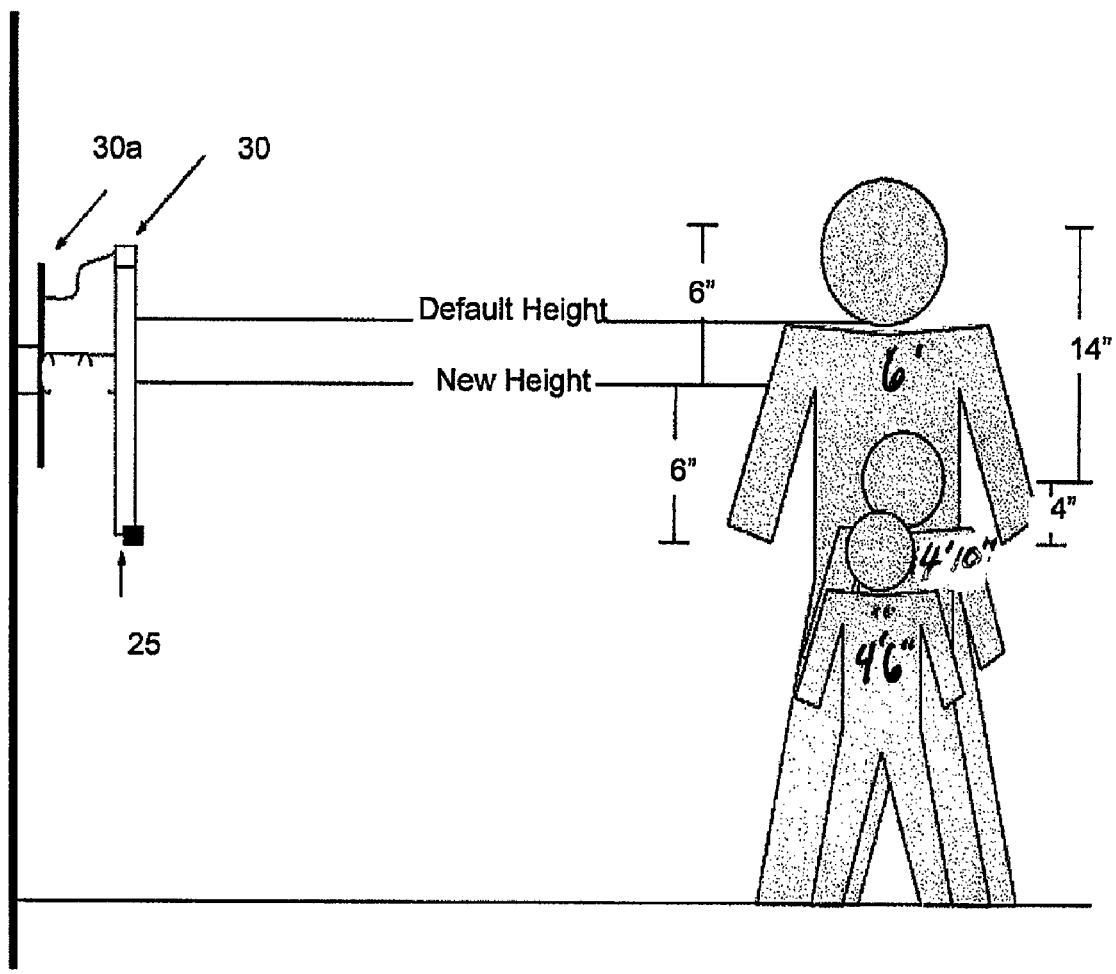

In FIG. 11, the display is moved in a vertical direction e.g., up or down, based on the height of the viewers. In this example, three viewers are at different heights with respect to the display. In accordance with the invention, the display will be adjusted to a new height from the default angle using an average height of the three viewers. Alternatively, in this example, the display can also be adjusted to a new height from the default based on an average height of the two extreme viewers (e.g., the shortest and tallest of the viewers).

Preferably facial recognition and/or detection technology, distance measuring device, heat sensor or motion detector is used in the examples of FIGS. 8-11. This will allow the system of the invention to determine a height or relative height of the viewers. These same type of detectors, in addition to the pressure sensor, can be used in remaining embodiments of the invention.

It should also be understood by those of skill in the art that the present invention is configured to adjust the display angle using any combination of techniques noted above. For example, the present invention can adjust the display angle using an averaging of both the location and height of each viewer with respect to one another and the display. Also, it should be recognized in view of the teachings discussed herein that the calculations to adjust the viewing angle may be based on facial recognition or detection, a general location of the user as detected by a pressure sensor, RFID, distance measuring device or a motion detector, to name a few.

In addition, it is contemplated that the system is configurable to preferences of certain viewers. By way of example, the facial recognition technology can be used to identify one or more particular viewers and, remembering their viewing habits or other preferences, automatically adjust the viewing angle to their preferences. The preferences may be stored in the storage 22B of FIG. 1. As another example, the preferences may indicated that the viewing angle should not change if the viewer only moves within a predetermined distance, e.g., within 10 inches of the originally detected location.

While the invention has been described in terms of embodiments, those skilled in the art will recognize that the invention can be practiced with modifications and in the spirit and scope of the appended claims.

What is claimed is:

1. A method for adjusting a viewing angle of a display for viewing by one or more people that are within a viewing range of the display, wherein at least one of the people are walking, the method comprising the steps of:
   a camera imaging the people within the viewing range of the display;
   based on the imaging by the camera, a computing device determining a number of the people which are substantially stationary and whether the number of the people which are substantially stationary exceeds a predetermined threshold which is greater than or equal to zero, and
   if so, the computing device instructing a motor to adjust a viewing angle of the display based on one or more locations of the one or more people which are substantially stationary to facilitate viewing of the display by the one or more people which are substantially stationary, and
   if not, the computing device instructing the motor to dynamically adjust a viewing angle of the display to track one or more of the people which are walking to facilitate viewing of the display by the one or more people which are walking.

2. The method of claim 1 wherein the one or more people which are walking are walking toward the display.

3. The method of claim 1 wherein the predetermined threshold is greater than or equal to one.

4. The method of claim 1 wherein the predetermined threshold is three.

5. The method of claim 1 wherein the number of the people which are substantially stationary does not exceed the predetermined threshold; and further comprising the steps of:
the computing device determining that the at least one of the people that are walking are walking toward the display, and the step of the computing device instructing the motor to dynamically adjust a viewing angle of the display to track one or more of the people which are walking is responsive to the determination that the at least one of the people that are walking are walking toward the display.

6. A system for adjusting a viewing angle of a display for viewing by one or more people that are within a viewing range of the display, wherein at least one of the people are walking, the system comprising:
a camera to image the people within the viewing range of the display;
a computing device, based on the images of the camera, programmed to determine a number of the people which are substantially stationary and whether the number of the people which are substantially stationary exceeds a predetermined threshold which is greater than or equal to zero, and
responsive to the number of the people which are substantially stationary exceeding the predetermined threshold, the computing device programmed to instruct a motor to adjust a viewing angle of the display based on one or more locations of the one or more people which are substantially stationary to facilitate viewing of the display by the one or more people which are substantially stationary, and
responsive to the number of the people which are substantially stationary not exceeding the predetermined threshold, the computing device programmed to instruct the motor to dynamically adjust a viewing angle of the display to track one or more of the people which are walking to facilitate viewing of the display by the one or more people which are walking.

7. The system of claim 6 wherein the one or more people which are walking are walking toward the display.

8. The system of claim 6 wherein the predetermined threshold is greater than or equal to one.

9. The system of claim 6 wherein the predetermined threshold is three.

10. The system of claim 6 wherein:
the number of the people which are substantially stationary does not exceed the predetermined threshold; and
the computing device is programmed to determine whether the at least one of the people that are walking are walking toward the display, and the programming in the computing device to instruct the motor to dynamically adjust a viewing angle of the display to track one or more of the people which are walking is responsive to a determination that the at least one of the people that are walking are walking toward the display.

11. A computer program product for adjusting a viewing angle of a display for viewing by one or more people that are within a viewing range of the display, wherein at least one of the people are walking, the computer program product comprising:
one or more computer-readable tangible storage devices and program instructions stored on at least one of the one or more storage devices, the program instructions comprising;
program instructions, based on images from a camera imaging the people within the viewing range of the display, to determine a number of the people which are substantially stationary and whether the number of the people which are substantially stationary exceeds a predetermined threshold which is greater than or equal to zero;
program instructions, responsive to the number of the people which are substantially stationary exceeding the predetermined threshold, to instruct a motor to adjust a viewing angle of the display based on one or more locations of the one or more people which are substantially stationary to facilitate viewing of the display by the one or more people which are substantially stationary, and
program instructions, responsive to the number of the people which are substantially stationary not exceeding the predetermined threshold, to instruct the motor to dynamically adjust a viewing angle of the display to track one or more of the people which are walking to facilitate viewing of the display by the one or more people which are walking.

12. The computer program product of claim 11 wherein the one or more people which are walking are walking toward the display.

13. The computer program product of claim 11 wherein the predetermined threshold is greater than or equal to one.

14. The computer program product of claim 11 wherein the predetermined threshold is three.

15. The computer program product of claim 11 wherein:
the number of the people which are substantially stationary does not exceed the predetermined threshold; and further comprising:
program instructions, stored on at least one of the one or more storage devices, to determine whether the at least one of the people that are walking are walking toward the display, and the program instructions to instruct the motor to dynamically adjust a viewing angle of the display to track one or more of the people which are walking is responsive to a determination that the at least one of the people that are walking are walking toward the display.

* * * * *